United States Patent [19]

Hedgley

[11] Patent Number: 4,591,061

[45] Date of Patent: May 27, 1986

[54] SAFETY CONTAINER FOR WASTE ORGANIC SOLVENTS

[75] Inventor: Edward J. Hedgley, London, England

[73] Assignee: Birkbeck College, London, England

[21] Appl. No.: 404,122

[22] Filed: Aug. 2, 1982

[30] Foreign Application Priority Data

Aug. 5, 1981 [GB] United Kingdom ................. 8123872

[51] Int. Cl.[4] ............................................. A47J 41/00

[52] U.S. Cl. .................................. 215/12 R; 215/235; 215/236; 215/273

[58] Field of Search ...................... 215/12 R, 235, 236, 215/265, 273, 274, 276, 334, 355, 356; 206/216

[56] References Cited

U.S. PATENT DOCUMENTS

| | | | |
|---|---|---|---|
| 134,586 | 1/1873 | Bradley | 215/235 |
| 801,109 | 10/1905 | Roosevelt | 215/276 |
| 1,159,057 | 11/1915 | Magnea | 215/265 |
| 1,342,657 | 6/1920 | Wolferman | 215/235 |
| 1,885,534 | 11/1932 | Moscrop | 215/12 R |
| 2,036,876 | 4/1936 | Kraft | 215/12 R |
| 2,452,195 | 10/1948 | Johnson | 215/12 R |
| 2,501,636 | 3/1950 | Smith | 215/276 |
| 2,507,648 | 5/1950 | Rosenheck | 215/12 R |
| 2,563,508 | 8/1951 | Anschicks | 215/12 R |
| 3,434,615 | 3/1969 | Barletta | 215/276 |
| 4,114,759 | 9/1978 | Maloney, Jr. | 215/12 R |
| 4,361,228 | 11/1982 | Hernandez | 206/216 |

FOREIGN PATENT DOCUMENTS

| | | |
|---|---|---|
| 621900 | 10/1935 | Fed. Rep. of Germany . |
| 819949 | 9/1951 | Fed. Rep. of Germany . |
| 841123 | 4/1952 | Fed. Rep. of Germany . |
| 427563 | 3/1911 | France . |
| 612361 | 10/1936 | France . |
| 11018 | of 1911 | United Kingdom . |

*Primary Examiner*—Joseph Man-Fu Moy
*Assistant Examiner*—David T. Fidei
*Attorney, Agent, or Firm*—Roylance, Abrams, Berdo & Goodman

[57] ABSTRACT

A portable safety container for the temporary storage, transport, and/or disposal of mixtures comprising waste organic solvents comprises a strong open-topped outer shell, such as part of a metal can, having at least one handle, an inner shell of material resistant to chemical corrosion, for example a glass bottle, fixed within the outer shell and having a protruding neck fitted with a hinged lid which remains open when the container is inverted for emptying but which is normally held closed by gravity when the container is upright.

12 Claims, 6 Drawing Figures

SAFETY CONTAINER FOR WASTE ORGANIC SOLVENTS

BACKGROUND OF THE INVENTION

1. Field of the Invention

This invention relates to a portable safety container or bin for the temporary storage and transport prior to disposal of waste organic solvents in and from such areas as laboratories.

2. Description of the Prior Art

A wide variety of solvents are in extensive use for purification, test and other laboratory procedures and in such uses may become mixed with other solvents and/or with aqueous liquids and/or diverse dissolved solids to an extent which may render them not immediately, or not at all, recoverable. Such mixtures may comprise highly volatile and inflammable materials such as ether and petroleum ether, highly volatile toxic materials such as chloroform, carbon tetrachloride and benzene, and hydrolysable materials such as halogenated hydrocarbons and carboxylic acid esters which, in contact with water, hydrolyse to produce corrosively acidic materials, the more rapidly if there is present in the mixture a water-miscible solvent such as acetone or dioxane, also in common use, which may homogenise the mixture. Laboratory waste solvents may also on occasion contain oxidizing agents such as the oxides of chromium, osmium and ruthenium or reducing agents such as the metal hydrides that on contact with water would generate a strongly basic medium which would moreover de-gas.

Such mixtures thus possess in varying degree fire, toxicity and corrosion hazards and, since they may not legally be flushed down conventional drainage systems, they must be stored in or near the premises where they arise until sufficient quantities have accumulated to justify their disposal in some alternative way or other. The design and selection of materials of construction for containers for such temporary storage present serious problems which have not hitherto been satisfactorily solved, from the points of view of fire avoidance, frangibility, and susceptibility to corrosion or direct attack by solvents. Thus, glass containers such as carboys, whilst nearly ideal from the point of view of resistance to chemical or solvent attack, are easily broken by impact or over-heating or pressure differential with the atmosphere; whilst metal containers, such as steel cans even when lead lined, are found in use to corrode rapidly, particularly at the base where penetration is least acceptable. Moulded plastics containers such as those of polyethylene or PVC are neither resistant enough to solvent attack not to abrasion by rough handling nor to heat to be suitable per se, whilst more resistant materials such PTFE are too expensive to be worth consideration.

SUMMARY OF THE INVENTION

In the present invention a combination of design features with selection of materials of construction of component parts is proposed whereby, in the resulting safety container, the risks of, or arising from, fire, spillage, leakage or breathing of the stored material, and breakage are reduced to an acceptably low level, by adopting a container that is twin-shelled, having an inner shell, offering maximal resistance to chemical corrosion, separated by a heat-insulating and shock-absorbing air space from an outer shell that provides not only the requisite mechanical strength but a full capacity emergency bund for the inner vessel should it suffer accidental fracture. An integral feature of the container design is a weighted flip-lid contrived to remain open when the container is inverted for emptying, to permit the contents of the closed container to breathe and to provide a flame-snuffing action if called upon. In a preferred form the container is endowed with considerable stability against accidental overturning even by rough treatment.

Thus, according to the present invention there is provided a portable safety container for the temporary storage, transport, and/or disposal of mixtures comprising waste organic solvents, which container comprises a strong open-topped outer shell having at least one handle, an inner shell of material resistant to chemical corrosion and adapted to hold said mixtures, said inner shell being fixed within and spaced away from the inside and base of the outer shell, and said inner shell having a neck protruding above the upper rim of the outer shell, said neck being fitted with a lid hingedly connected with said neck so as to remain open when said container is inverted for emptying but so as normally to be held closed by gravity when said container is upright, said outer shell having a capacity sufficient to hold the entire contents of said inner shell in the case that said inner shell should suffer accidental fracture.

In a preferred form of the invention there is provided a portable safety container or bin for the temporary storage, transport, and/or disposal of mixtures comprising waste organic solvents, comprising a bottle of chemically resistant material, fixed within and spaced away from the sides and base of an open-topped metal containing-vessel bearing one or more handles, the neck of said bottle protruding above the upper rim of said containing-vessel and bearing a thread, onto which is screwed a frusto-conical plastics member in the form of a moulding or turning having a central orifice substantially collinear with the neck of the bottle, said moulding bearing, in addition to the thread which engages that on the neck of the bottle, an upper internal thread which is engaged by an external thread on the lower portion of a closure/funnel assembly comprising a hollow cylinder having an inverted frusto-conical internal section forming a funnel, with a central orifice substantially collinear with that of the moulding, said hollow cylinder having hinged thereabove a flat circular lid weighted at the portion of circumference opposite to the hinge, the hinge being so designed that, when fully open, the lid is positioned at about 60° below the horizontal, and the weight being so chosen and designed that firstly, the lid remains in said fully open position when the safety container is inverted to empty its contents, and secondly, the lid in the fully closed position is held firmly against the funnel assembly; and resting upon the upper rim of the said metal containing-vessel is a frusto-conical sheet-metal shield forming a protector for the upper part of the said bottle, the diameter of said shield at its lower rim being slightly greater than that of the metal containing vessel and its dimensions at its upper rim being selected so that the upper rim of the shield can be held securely between the said closure/funnel assembly and the said plastics member when they are screwed together.

The bottle may suitably be positioned within the containing-vessel by the provision of an annulus, e.g. of plywood, fixed within the upper rim of the latter, having an internal diameter slightly larger then the diameter of the bottle which may stand upon a platform, also suitably of plywood, spaced away from the base of the containing-vessel; it may be fixed firmly in such a position by, for example, the provision of an opposite pair of arcuate lugs, one attached to the containing-vessel and the other movable in a horizontal direction by means of, for example, a screw or spring-held cam and lever. The bottle may most suitably be of glass and have a capacity of about 5 liters; such bottles, having a threaded neck, are commercially available, being largely used as beverage containers. Polyethylene is a possible alternative material for special applications, for example, if hydrofluoric acid is involved, where heat resistance is of secondary importance to specific corrosion resistance.

The containing-vessel may suitably be of mild steel and spaced away from the bottle by a distance of about 5 cm. at base and sides; if a standard 5-liter bottle, such as described above, is used, the lower half of a standard 5-gallon cylindrical can used commercially for pure solvents provides a suitable capacity and dimensions, with the further advantage that the protruding flange at the base provides a hand-hold during emptying. Such a metal containing-vessel too provides a smooth surface of adequate size for the affixment of any labels of content as may be a statutory requirement. Handles for carrying the safety container are preferably two in number, oppositely mounted on the containing-vessel and, preferably, substantially flush with its walls when not in use, for example swivel-mounted or comprising lengths of chain.

The frusto-conical plastics member is most suitably of high density polyethylene and the closure-funnel assembly of anodized aluminum or light alloy, or heat resisting plastic, the weight being suitably of lead melt-moulded onto the closure.

The shield is most suitably of colour-anodized aluminium sheet, the colour chosen for ease of recognition and to code designation of purpose in the laboratory or workplace.

Optional additional features of the safety container are:

(1) a groove within the funnel of the closure/funnel assembly, positioned opposite the hinge to facilitate pouring during emptying; (2) the edge of the circular closure may to advantage be turned down somewhat to form a more intimate fit with the top of the funnel assembly; (3) a crimped strengthening member on the upper surface of the closure, lying diametrically between the hinge and the weight and providing an anchorage for both; (4) a float, suitably of hollow glass supported by a stainless steel wire designed to enter the orifice of the container but not to pass entirely therewithin, to indicate when the bottle has been nearly filled with waste material; (5) a washer, suitably of neoprene, interposed between the mouth of the bottle and the plastics moulding; (6) a bung, suitably of polyethylene, slightly tapered and having a generous finger-hold, and fitting the orifice of the funnel assembly, and attached by a length of chain to a point [e.g. on a rivetted securing flange of ridge (7) on the exterior of the shield] on the safety container, providing an always available auxiliary closure for the container in transit.

BRIEF DESCRIPTION OF THE DRAWINGS

The safety container in a preferred form is illustrated in FIGS. 1–6 of the accompanying drawings.

DESCRIPTION OF THE PREFERRED EMBODIMENTS

Figure 1:
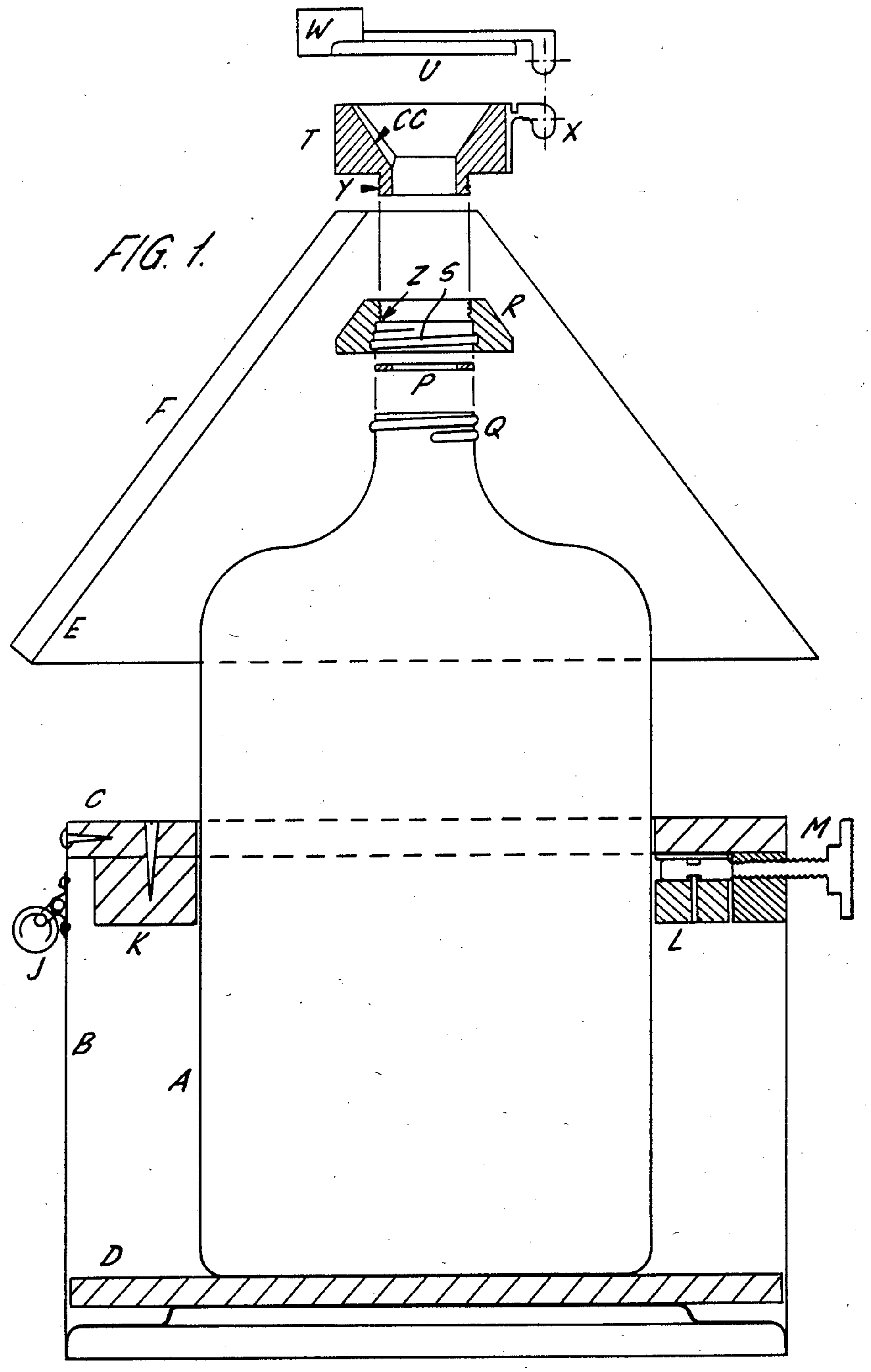
FIG. 1 shows the container in section with the upper components disassembled, the lid being separately shown, respectively, in section and in plan in FIGS. 2 and 3.
Figure 2:
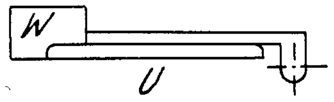
Figure 3:
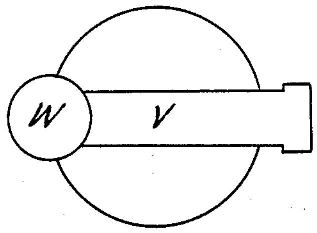
Figure 4:
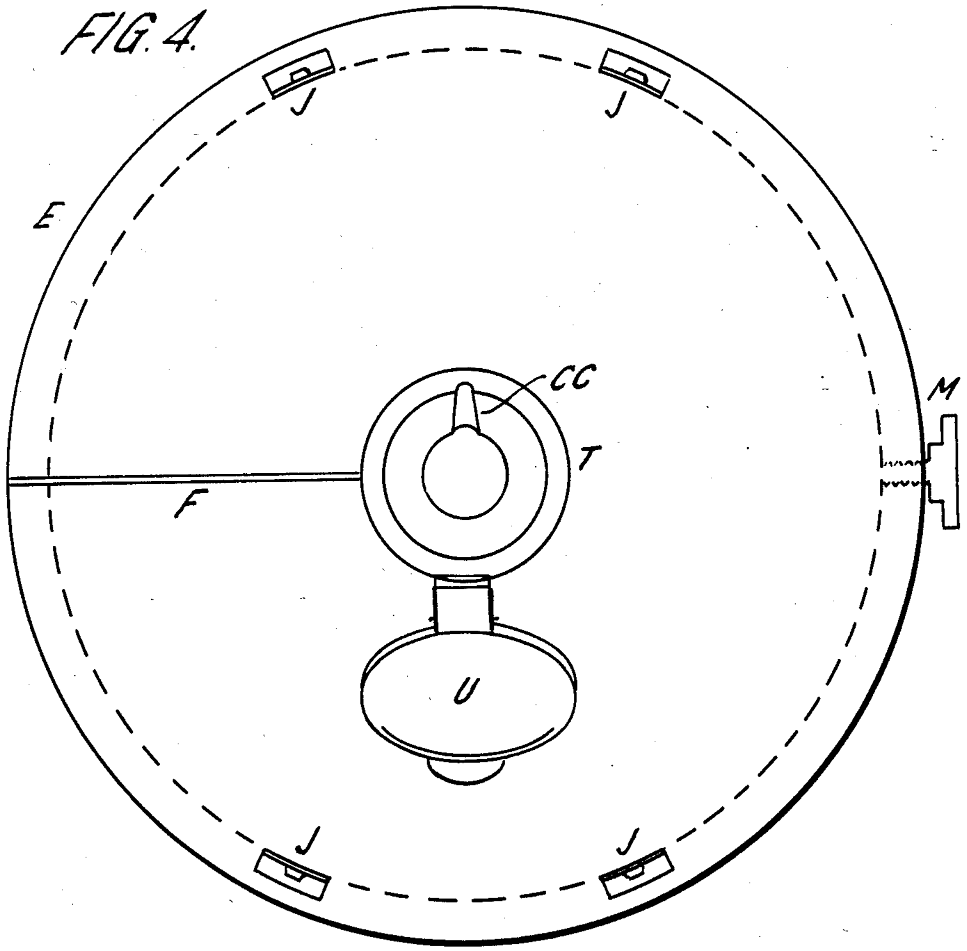
FIG. 4 shows the upper part of the container in plan, the lid, in open position, being shown in perspective.
Figures 5, 6:
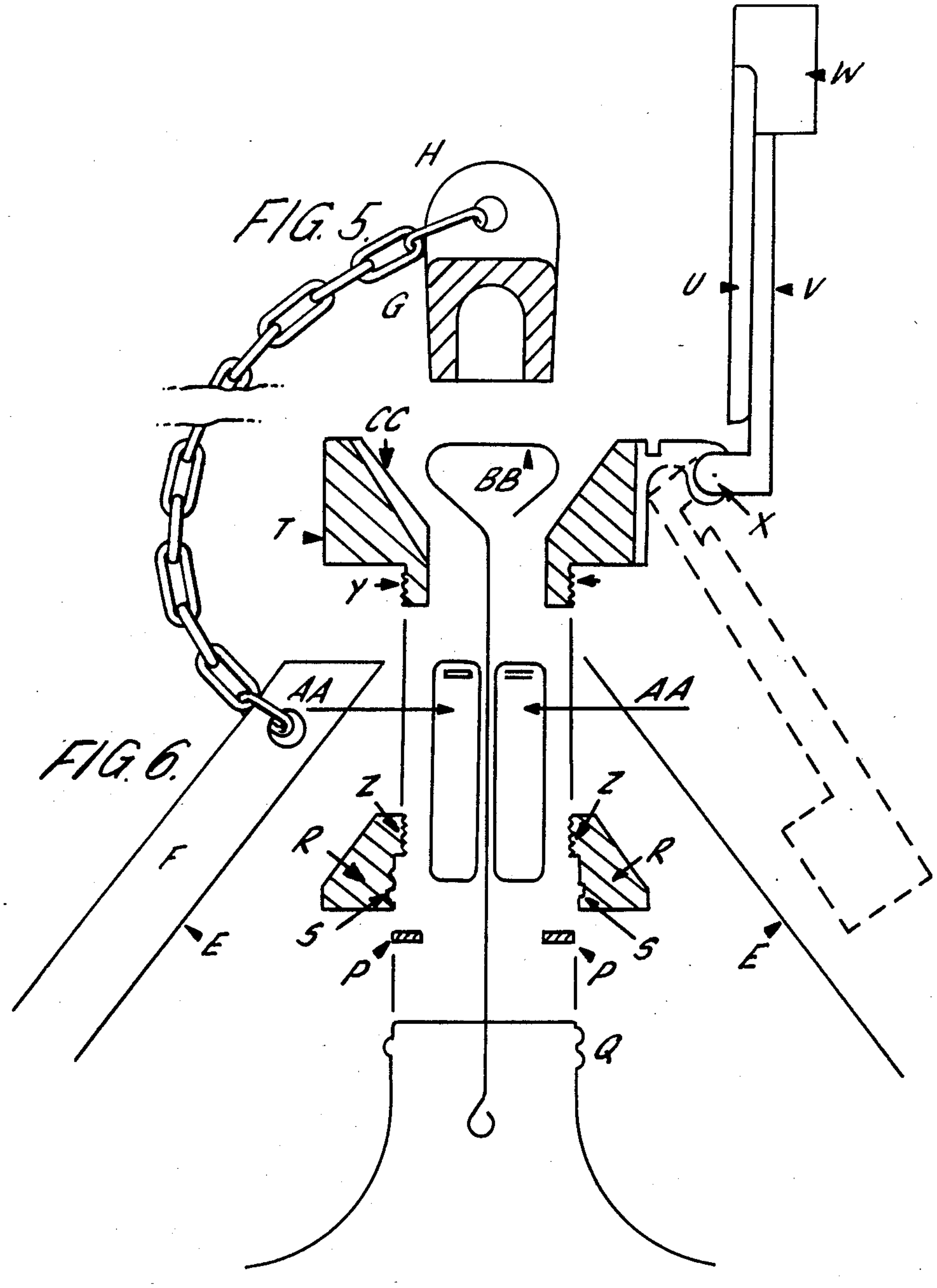
FIG. 5 shows in section the bung used during transport of the container.
FIG. 6 shows in section the upper part of the container in detail, the separate components being disassembled; the lid is shown in partly and fully open positions (the latter by dotted lines), and the float is shown in section within the central orifice.

The separate components of the safety container are designated by the letters A–Z and AA–CC, which apply (where appropriate) to all of the FIGS. 1–6. In FIG. 1, A is a 5-liter glass bottle with threaded neck Q, supported within the lower half B of a 5-gallon mild-steel can, bearing opposite chain handles J. The bottle, supported by an annulus C and a platform D of plywood, is secured in place by arcuate lugs K,L, the former fixed to B or C and the latter movable horizontally by the screw M. Adapted to engage the thread Q of the bottle-neck is the thread S of a frusto-conical high density polyethylene moulding R, which in the engaged position rests on a neoprene washer P. The upper portion of R possesses an internal thread Z, adapted to engage the thread Y of the funnel/closure assembly T,U,V,W,X, wherein T is an anodized aluminium casting, U is a circular closure (lid) of anodized aluminium, hinged at X, X then bearing against T and so preventing U from descending further than about 60° below the horizontal; V is crimped strengthening member fixed to the surface of U and lying diametrically between X and a lead weight W, melt-moulded over the rim of U and the end of V. A hollow conical shield E of anodized sheet alumnium is so shaped as to be held between the lower surface of T and the upper surface of R when they are screwed together, then projecting slightly beyond and below the upper rim of B; it bears a flange F to which is attached by a length of chain a polyethylene bung G (shown separately in FIG. 5) with a finger-hold H. In FIGS. 1 and 4, CC is a recessed pouring groove shown respectively in section and in plan, and in FIG. 6, AA is a hollow cylindrical glass float, holdable within the orifice of T by a shaped stainless steel wire BB.

I claim:

1. A portable safety container for temporarily storing, transporting and/or disposing of waste organic solvent mixtures, comprising:

a strong, fire-resistant, open-topped outer shell having a side wall, a continuous base and an upper rim;

an inner shell, of material resistant to chemical corrosion for holding the mixtures, fixed within said outer shell and spaced inwardly from inner surfaces of said side wall and said base, said inner shell being separated from said outer shell by a heat-insulating and shock-absorbing air space, said inner shell having a capacity, said outer shell having a capacity sufficient to hold said capacity of said inner shell upon accidental fracture of said inner shell;

an upper part with a neck of said inner shell protruding above said upper rim of said outer shell;

a lid hingedly connected to said neck which will remain open when the container is inverted for emptying and which will normally be held closed by gravity when the container is upright; and shield means covering the neck of said inner shell, said shield means forming a fully enclosed fire-resistant housing with said lid and said outer shell;

wherein said inner shell comprises a bottle of chemically resistance material;

said outer shell comprises a metal-containing vessel;

said neck of said bottle has a thread threadedly receiving a plastic frusto-conical member having a central orifice substantially coaxial with said neck of said bottle;

said frusto-conical member has, in addition to a thread engaging the neck of the bottle, an upper internal thread engaged by an external thread on a lower portion of a closure/funnel assembly comprising a hollow cylinder having an inverted frusto-conical internal section forming a funnel with a central orifice substantially coaxial with said orifice of said frusto-conical member, said hollow cylinder having said lid hinged thereabove;

said lid comprises a flat circular lid weighted at a portion of circumference opposite to a hinge thereof, the hinge being so designed that, in a fully open position, the lid is positioned at about 60° below the horizontal, and the weight being so chosen and designed that firstly, the lid remains in said fully open position when the safety container is inverted to empty its contents, and secondly, the lid remains in a fully closed position and is held firmly against the funnel assembly when the container is upright; and resting upon the upper rim of the said metal-containing vessel is a frusto-conical sheet-metal shield forming a protector for the upper part of the said bottle, the diameter of said shield at its lower rim being slightly greater than that of the metal-containing vessel and its dimensions and diameter at its upper rim being selected so that the upper rim of the shield can be held securely between said closure/funnel assembly and the said plastic frusto-conical member when they are threaded together.

2. A container as claimed in claim 1 wherein said funnel comprises a groove positioned opposite said hinge of the lid to facilitate pouring during emptying of the container.

3. A container as claimed in claim 1 wherein a float is positioned in an orifice of the container to indicate when the container has been nearly filled with waste material.

4. A container as claimed in claim 1 wherein a tapered bung fitting the orifice of the funnel assembly is attached by a length of chain to the container.

5. A container as claimed in claim 1 wherein said frusto-conical member is in the form of a molding.

6. A container as claimed in claim 1 wherein said frusto-conical member is in the form of a turning.

7. A portable safety container for temporarily storing, transporting and/or disposing of waste organic solvent mixtures, comprising:

a strong, open-topped outer shell having a side wall, a base and an upper rim;

an inner shell, of material resistant to chemical corrosion for holding the mixtures, fixed within said outer shell and spaced inwardly from inner surfaces of said side wall and said base, said inner shell being separated from said outer shell by heat-insulating and shock-absorbing air space, said inner shell having a capacity, said outer shell having a capacity sufficient to hold said capacity of said inner shell upon accidental fracture of said inner shell;

an upper part with a neck of said inner shell protruding above said upper rim of said outer shell;

a lid hingedly connected to said neck which will remain open when the container is inverted for emptying and which will normally be held closed by gravity when the container is upright;

a shield covering the neck of said inner shell and the upper rim of said outer shell; and means attachable to said neck of said inner shell to retain said shield in place;

said shield, said lid and said outer shell forming a fully enclosed fire-resistant housing;

said means includes a first element engageable with said neck and a second element engageable with said first element;

said shield being retained between said first and second elements.

8. A portable safety container according to claim 7 wherein said outer shell is made of metal and is cylindrical;

said inner shell is a bottle; and said shield is conical.

9. A portable safety container according to claim 7 wherein a lower portion of said shield bounds a cross-sectional area greater than an area bounded by said upper rim such that said shield extends outwardly over and overlaps said upper rim.

10. A portable safety container according to claim 7 wherein said neck includes a thread engaged by said first element, said first element extending above the neck of said bottle.

11. A portable safety container according to claim 10 wherein said first element includes a first threaded portion, said second element including a second threaded portion which engages said first threaded portion.

12. A portable safety container according to claim 11 wherein said means has an opening coaxial with said neck, said lid closing said opening, said opening including a funnel-shaped portion.

* * * * *